(12) United States Patent
Gonzalvo et al.

(10) Patent No.: US 8,646,092 B2
(45) Date of Patent: Feb. 4, 2014

(54) METHOD OF DYNAMIC PROTECTION OF DATA DURING THE EXECUTION OF A SOFTWARE CODE IN INTERMEDIATE LANGUAGE IN A DIGITAL APPARATUS

(75) Inventors: Benoit Gonzalvo, Gemenos (FR); Jacques Jean-Alain Fournier, Marseilles (FR)

(73) Assignee: Gemalto SA, Meudon (FR)

( * ) Notice: Subject to any disclaimer, the term of this patent is extended or adjusted under 35 U.S.C. 154(b) by 821 days.

(21) Appl. No.: 12/374,234

(22) PCT Filed: Jul. 18, 2007

(86) PCT No.: PCT/EP2007/057417
§ 371 (c)(1),
(2), (4) Date: Jan. 16, 2009

(87) PCT Pub. No.: WO2008/009697
PCT Pub. Date: Jan. 24, 2008

(65) Prior Publication Data
US 2009/0328231 A1    Dec. 31, 2009

(30) Foreign Application Priority Data

Jul. 20, 2006  (EP) .................................... 06291183

(51) Int. Cl.
*G06F 7/04*    (2006.01)
(52) U.S. Cl.
USPC .................................. 726/26; 705/50; 705/51
(58) Field of Classification Search
USPC ........................................ 705/50–51; 726/26
See application file for complete search history.

(56) References Cited

U.S. PATENT DOCUMENTS

| | | | | |
|---|---|---|---|---|
| 4,524,416 A | * | 6/1985 | Stanley et al. | 711/200 |
| 4,697,233 A | * | 9/1987 | Scheuneman et al. | 711/169 |
| 4,866,599 A | * | 9/1989 | Morganti et al. | 726/17 |
| 5,471,487 A | * | 11/1995 | Andrighetti | 714/811 |

(Continued)

FOREIGN PATENT DOCUMENTS

| | | | |
|---|---|---|---|
| WO | WO 01/88705 A1 | 11/2001 | |
| WO | WO 2005/101725 A1 | 10/2005 | |
| WO | WO2007/085785 A1 * | 8/2007 | G06F 21/00 |

OTHER PUBLICATIONS

Gelernter, D., "Truth, Beauty, and the Virtual Machine", Discovery Magazine, Sep. 1, 1997, all pages, http://discovermagazine.com/1997/sep/truthbeautyandth1217/article_print.*

(Continued)

*Primary Examiner* — Calvin Cheung
(74) *Attorney, Agent, or Firm* — Buchanan Ingersoll & Rooney PC

(57) ABSTRACT

The invention concerns a method for protecting the data of an application compiled in intermediate for execution executed on a digital apparatus equipped with a virtual machine managing the execution of the code via a execution stack defining at least one stack frame corresponding to a method called during the execution of the code. A secured execution mode of the code involves the determination of at least one global checksum associated with each stack frame and, each time that a datum of the code is manipulated, the calculation of a local checksum associated with that datum. The calculation is on one hand, on the global checksum associated with the stack frame corresponding to the manipulated datum and, on the other hand, on at least one part of the other data constituting the stack frame.

18 Claims, 4 Drawing Sheets

(56) References Cited

U.S. PATENT DOCUMENTS

| | | | | |
|---|---|---|---|---|
| 5,644,709 | A * | 7/1997 | Austin | 714/53 |
| 5,805,920 | A * | 9/1998 | Sprenkle et al. | 710/1 |
| 6,477,702 | B1 * | 11/2002 | Yellin et al. | 717/126 |
| 6,742,081 | B2 * | 5/2004 | Talagala et al. | 711/114 |
| 6,785,886 | B1 * | 8/2004 | Lim et al. | 718/1 |
| 7,117,485 | B2 * | 10/2006 | Wilkinson et al. | 717/139 |
| 7,272,748 | B1 * | 9/2007 | Conover et al. | 714/20 |
| 7,302,550 | B1 * | 11/2007 | Merck | 712/202 |
| 7,392,404 | B2 * | 6/2008 | Montgomery et al. | 713/194 |
| 7,426,721 | B1 * | 9/2008 | Saulpaugh et al. | 717/144 |
| 7,430,670 | B1 * | 9/2008 | Horning et al. | 713/190 |
| 7,444,644 | B1 * | 10/2008 | Slaughter et al. | 719/315 |
| 7,581,089 | B1 * | 8/2009 | White | 712/242 |
| 7,716,555 | B2 * | 5/2010 | Andou | 714/766 |
| 7,945,953 | B1 * | 5/2011 | Salinas et al. | 726/22 |
| 2001/0044912 | A1 * | 11/2001 | Francis et al. | 714/30 |
| 2002/0112227 | A1 * | 8/2002 | Kramskoy et al. | 717/148 |
| 2002/0144115 | A1 * | 10/2002 | Lemay et al. | 713/168 |
| 2002/0161972 | A1 * | 10/2002 | Talagala et al. | 711/114 |
| 2003/0028742 | A1 | 2/2003 | Hameau et al. | |
| 2003/0177435 | A1 * | 9/2003 | Budd et al. | 714/776 |
| 2003/0217277 | A1 * | 11/2003 | Narayanan | 713/187 |
| 2003/0226022 | A1 | 12/2003 | Schmidt et al. | |
| 2004/0107200 | A1 * | 6/2004 | Sjogren et al. | 707/100 |
| 2004/0255146 | A1 * | 12/2004 | Asher et al. | 713/200 |
| 2005/0076226 | A1 * | 4/2005 | Boivie et al. | 713/187 |
| 2005/0246511 | A1 * | 11/2005 | Willman et al. | 711/163 |
| 2005/0283770 | A1 * | 12/2005 | Karp et al. | 717/151 |
| 2006/0136720 | A1 * | 6/2006 | Armstrong et al. | 713/164 |
| 2006/0179483 | A1 * | 8/2006 | Rozas | 726/22 |
| 2006/0195824 | A1 * | 8/2006 | Iwamoto | 717/133 |
| 2007/0005992 | A1 * | 1/2007 | Schluessler et al. | 713/193 |
| 2007/0101236 | A1 * | 5/2007 | Bauerle et al. | 714/763 |
| 2007/0165937 | A1 * | 7/2007 | Markov et al. | 382/141 |
| 2007/0285271 | A1 * | 12/2007 | Erlingsson et al. | 340/815.84 |
| 2007/0294496 | A1 * | 12/2007 | Goss et al. | 711/163 |
| 2008/0146178 | A1 * | 6/2008 | Lu et al. | 455/187.1 |
| 2008/0232582 | A1 | 9/2008 | Chevallier-Mames et al. | |
| 2009/0144561 | A1 * | 6/2009 | Davidson et al. | 713/190 |
| 2012/0310892 | A1 * | 12/2012 | Dam et al. | 707/659 |

OTHER PUBLICATIONS

Shavit et. al., "Definition: Virtual Machine (VM)", Jul. 2007, all pages, http://searchservervirtualization.techtarget.com/definition/virtual-machine.*

"Virtual Memory Tutorial", Jul. 1, 2006, all pages, http://www.cs.gmu.edu/cne/modules/vm/green/defn.html.*

Regev, H., "Definition: Virtual Memory", May 1998, www.searchstoragetechtarget.com, all pages, http://searchstorage.techtarget.com/definition/virtual-memory.*

Josef Neliβen, "Buffer Overflows for Dummies", May 1, 2002, all pages.*

Form PCT/ISA/210 (International Search Report) dated Sep. 6, 2007.

Form PCT/ISA/237 (Written Opinion of the International Searching Authority) dated Sep. 6, 2007.

Gilles Grimaud et al., "FACADE: A Typed Intermediate Language Dedicated to Smart Cards", Software Engineering Notes, Sep. 6, 1999, vol. 24, No. 6, pp. 476-493, New York, New York, U.S., XP-002161892.

Inria, "Verificard at INRIA", INRIA Online, Sep. 19, 2003, 4 pages, XP-002418434. Retrieved from the Internet: URL:http://www-sop.inria.fr/lemme/verificard>.

Simon Moore et al., "Balanced Self-Checking Asynchronous Logic for Smart Card Applications", Microprocessors and Microsystems, 2003, vol. 27, pp. 421-430, XP-002418435.

* cited by examiner

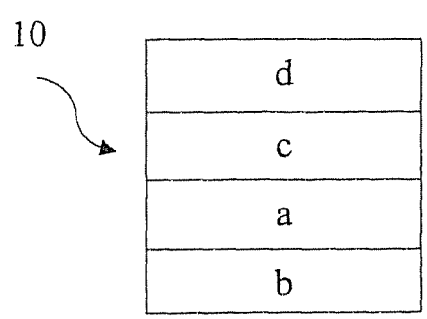
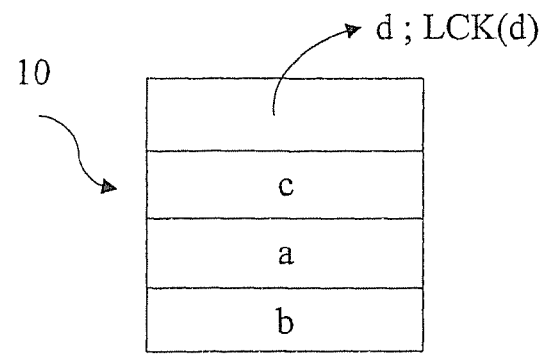
Fig.3a    Fig.3b
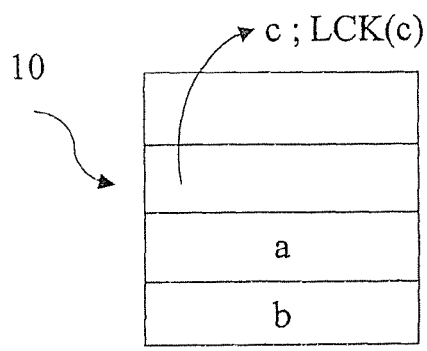
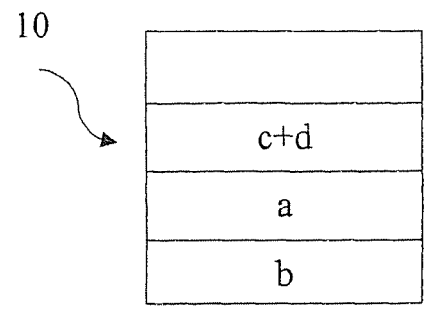
Fig.3c    Fig.3d

METHOD OF DYNAMIC PROTECTION OF DATA DURING THE EXECUTION OF A SOFTWARE CODE IN INTERMEDIATE LANGUAGE IN A DIGITAL APPARATUS

The present invention relates to software and execution environments loaded in a digital apparatus and, in particular, a method of dynamic protection of data, in particular in view of attacks due to a fault, during the execution of an application compiled in intermediate language on a digital apparatus equipped with a virtual execution machine.

The invention applies to any type of digital apparatus, portable or not, such as a computer but also any apparatus equipped with a microcontroller comprising a processor and storage devices, such as a smart card.

The desire to create inter-operable applications has resulted in the development of intermediate programming languages. The main aim of said languages is thus to make their software independent of the hardware on which they must be executed. The software is therefore planned for being executed in the form of an intermediate code independent of the underlying architecture.

The programmers are thus globally freed of the constraints linked to specific hardware. The intermediate languages such as the Java bytecode, obtained following compilation of the Java source language, have thus undergone considerable development. The MSIL (acronym for "Microsoft intermediate language") intermediate language can also be cited: it is deployed within the framework of the Net or DotNet (registered trademark) environment, obtained following compilation of various possible source languages such as C++ or C#.

The intermediate code therefore conventionally corresponds to a compiled form of the software. Said software, compiled in Java, or in other intermediate languages, such as Net, cannot be executed as such by the processor of the apparatus on which one wishes to execute a program compiled in the form of intermediate code. It is necessary to introduce a software layer having for main function of interpreting the intermediate code in instructions that can be executed by the processor of the host apparatus. Said software layer is known as a "virtual machine". For example, the JAVA virtual machine allows Java software to be executed on a given platform on which it is implemented.

Java software is conventionally distributed in the form of a set of modules consisting of class files, corresponding to a compiled form of the software. Each compiled file corresponds to a class type data structure and comprises in as much the information for said class: i.e., the description of the elements of the class (its constants, its fields, its methods), the description of the elements used by the class and defined in other classes (fields and methods), the code of the methods of the class in the form of instructions that can be interpreted (bytecode) by the interpreter of the Java virtual machine.

In a simplified manner, a class file has for example the following structure:

```
ClassFile {
    Field__list;    //Description of the fields of
the class
    Method__list;   //Methods of said class
(including their bytecode, i.e. their instructions that
can be interpreted by the interpreter of the virtual
machine)
}
```

Thus, by way of example, within the framework of a Java electronic purse application, a class known as "Purse" may be defined, with its "balance" field and its "decrementBalance( )" method. The class file may have the following structure:

```
Public class Purse {
    private int balance = 0;
    public void decrementBalance( ){
        this.balance = this.balance − 1;
    }
}
```

Thus, according to said example, the execution of the method of the "Purse" class consists in removing the value 1 at the current instance of the balance field.

The execution of the corresponding Java software is carried out by the Java virtual machine installed on the digital apparatus.

Said virtual machine transforms the information from the ClassFile into work storage data structures which are specific to the virtual machine and which allow said virtual machine to interpret and execute the software. Said data structures are conventionally organised in the form of stacks, wherein the data are stored one on top of the other in the order wherein they arrive.

The virtual machine has a set of specific instructions, each instruction being coded on one or more octets. The set of instructions of the virtual machine comprises for example a certain number of conventional instructions such as the arithmetic, logic operations and jumps.

Currently, the execution of an application by the virtual machine is not entirely secured, in particular in relation to attacks in general and, in particular, attacks due to a fault. Thus, the sensitive value in the abovementioned example, shown in the "balance" field, may be modified following the injection of a fault during the manipulation of said value for the interpretation of the method for updating said field by the virtual machine, resulting in setting a final value in the execution stack for the balance field different to the one normally expected. For example, the balance field may be forced to its maximum value.

A known manner of combating said type of attacks due to a fault consists of adding a protection device at the level of the application, in the form of a redundant control code inserted within same of the code of the application having to be executed by the virtual machine.

For example, in order to protect the preceding code, it is possible to use in Java, as a checksum, the complemented value of the balance field, noted ~balance, which sends the complement to 1 of the binary balance value, and to update said checksum value at the same time with the update of the balance value during the execution of the method by the virtual machine. The comparison of the result of the two update calculations carried out at the same time, on one hand for the balance field and, on the other hand, the complemented ~balance field, therefore allows the integrity of the data to be verified which were used to establish the calculations. The java code modified accordingly therefore has the following structure:

```
public class Purse {
    private int balance = 0;
    private int balChecsum = ~balance; // = 0xFFFFFFFF
    public void decrementBalance( ){
```

-continued

```
        this.balance = this.balance – 1;
        this.balChecsum = this.balChecsum + 1;
        }
    }
}
```

The disadvantage of such a method for securing the execution of the Java code is that it is highly resource and calculation time consuming, which is unfavourable in the constraint environments such as the smart cards.

Furthermore, said solution implies that the code developers are familiarised and are conscious, at the time of the development, of the manner of protecting the sensitive parts of the code. Therefore, in reality it is restrictive for the developers to add code in order to protect their application.

The invention aims to resolve one or more of said disadvantages.

The object of the invention is thus a method for protecting the data of an application compiled in intermediate code planned for being executed on a digital apparatus equipped with a virtual machine managing the execution of the code via an execution stack defining at least one stack frame corresponding to a method called during the execution of the code.

According to the invention, the method includes the application of a secured execution mode of the code, comprising:
 the determination of at least one global checksum associated with each stack frame and,
 each time that a datum of the code is manipulated, the calculation of a local checksum associated with said datum, based on one hand, on the global checksum associated with the stack frame corresponding to the manipulated datum and, on the other hand, on at least one part of the other data constituting said stack frame.

According to one particular embodiment, the method comprises the division of each stack frame into a plurality of areas and the determination of a plurality of global checksums (gck0, gck1, gck2, gck3) respectively associated with each area of the stack frame.

According to said particular embodiment, the local checksum associated with the manipulated datum comprises the determination beforehand of the global checksum associated with the area of the stack frame wherein the manipulated datum is stored.

Advantageously, the calculation of the local checksum associated with the manipulated datum is performed on one hand, based on the global checksum associated with the area of the stack frame wherein the manipulated datum is stored and, on the other hand, on other data of said area of the stack frame.

Preferably, each stack frame is broken down into two areas, respectively corresponding to a local variable area of the method called and an operand stack area of said method.

According to one embodiment, the method is implemented in a software manner.

According to another embodiment, the method is implemented in a hardware manner.

The invention also concerns a virtual machine for executing an application compiled in intermediate code on a digital apparatus, characterised in that it is likely to be stored in a non-volatile storage device of the apparatus and likely to implement the method according to the invention.

The invention again concerns a digital apparatus comprising a non-volatile storage device storing in memory the virtual machine according to the invention.

Other special features and advantages of the invention will become apparent from reading the description made by way of non-limitative example and in relation to the following figures wherein:

FIGS. 3a to 3d illustrate a second example of embodiment of the invention;

The invention therefore aims to protect the execution of an application compiled in intermediate code on a digital apparatus equipped with a virtual execution machine for the interpretation of the code of the application.

The protection mechanism according the present invention acts, as will be seen later in greater detail, at the level of the stack frame, showing a reserved storage block, in the execution stack of the virtual machine, during the execution of a method of the code.

Figure 1:
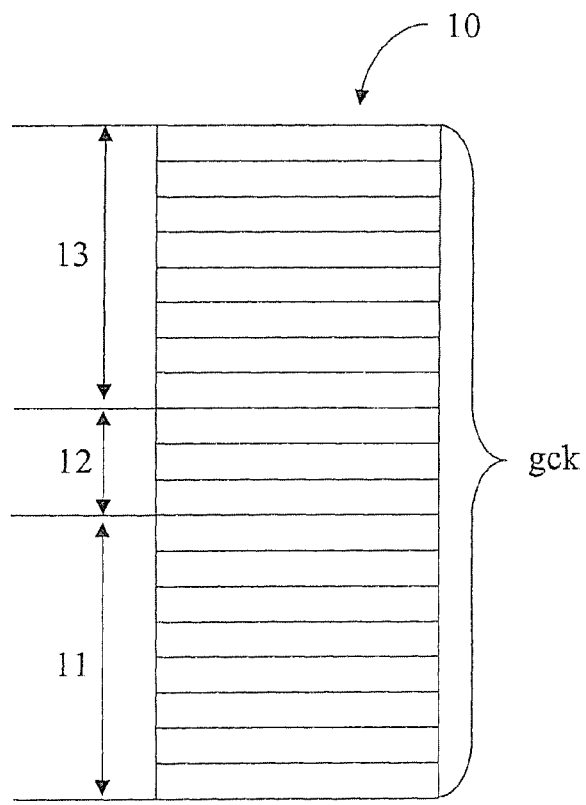
FIG. 1 illustrates the storage structure of a stack frame, at the level of which acts the protection mechanism according to the present invention.

FIG. 1 illustrates the structure of such a stack frame 10, which typically contains the parameters of the method called, i.e. its local variables 11, its operand stack 13, along with system data 12, comprising in particular the return address allowing the preceding stack frame to be found. Indeed, it is common that a first method, with which is associated a first stack frame, requires for its execution itself to call a second method, with which is associated a second stack frame. In this case, when the first method is called, at a given moment of the progress of its execution, the second method is called, involving working in the stack frame associated with said second method. When the actions performed in the stack frame associated with the second method are finished, the system data and more specifically the return address, of the stack frame associated with the second method are used for finding the preceding stack frame associated with the first method.

The general principle of the invention therefore consists of adding a safety mechanism at the level of each stack frame of the virtual machine, with the objective of being able to guarantee at any time the integrity of the data maintained in the associated stack frame during the execution of a method.

For this, with each stack frame of the virtual machine such as illustrated in FIG. 1, is first associated a gck global checksum. The gck global checksum value is calculated using all of the data of the stack frame, i.e. all of the elements constituting the operand stack 13 and all of the local variables 11.

Then, each time that a datum of a stack frame, i.e. an element of the operand stack 13 or local variables 11, is unstacked for any operation, an associated local checksum may therefore be calculated dynamically, using on one hand, the global checksum associated with the stack frame concerned, calculated beforehand and maintained in the stack frame and, on the other hand, the other data of the stack frame concerned.

It will be advisable, each time that a datum of a stack frame is manipulated by the virtual execution machine, to update accordingly the global checksum associated with the stack frame.

The general principles explained above on which the invention is based will now be described in greater detail. For this, are first provided hereafter definitions useful for the description of the calculation functions of the global checksums, associated with each stack frame, and local checksums, likely to being associated with each datum of a stack frame based on the associated global checksum.

Indeed, for the purpose of the invention, it is necessary to define two types of function, one of which is planned for acting globally on a stack frame, whereas the other allows the calculations executed by the virtual machine on one or more data to be monitored locally, in particular based on the global checksum associated with the stack frame corresponding to the data concerned. By using such a combination of functions, it will be seen that it is therefore possible to guarantee the integrity of the data manipulated by the virtual machine at any time of the execution of the code.

Either V the space of values on the s long registers. For example, for the 32-bit long registers, the following is obtained:

$V=[-2147483648, 2147483647]=[-2^{31}, 2^{31}-1]$

The GCK global checksum calculation function associated with a stack frame is defined in the following manner:

GCK: $V \times V \times \ldots \times V$---------->V (S0, S1, ..., Sn−1)|------>GCK(S0, ..., Sn−1)

S0, S1, ..., Sn−1, being all of the data constituting a given stack frame.

The LCK local checksum calculation function associated with the S0 datum is defined in the following manner:

LCK: V---------->V

S0|-------->LCK(S0)

The GCK function must have the following attribute:

Either the GCK and LCK function such as above defined, we will consider any F function such as, for any data set (S0, ..., Sn−1):

GCK(S0, S1, ..., Sn−1)=F(LCK(S0), ..., LCK(Sn−1))

By way of example, by using the ~ complement operator applied to the sum of all of the elements of a given stack frame, the following is defined:

GCK: $V \times V \times \ldots \times V$---------->V (S0, S1, ..., Sn−1)|------>~(S0+ ... +Sn−1)

LCK: V------------>V

S0|---------->S0

Or the F function defined by:

F: $V \times V \times \ldots \times V$------>V (X0, X1, ..., Xn−1)|--->Sum(Xi, i=0, ..., n−1)+n−1

Therefore:

GCK(S0, S1, ..., Sn−1)=~(S0+ ... +Sn−1)=~S0+ ... +~Sn−1+n−1=F (~S0, ..., ~Sn−1)=F(LCK(S0), ..., LCK(Sn−1)).

From there, if the gck value of the global checksum associated with a stack frame (gck=GCK(S0, S1, ..., Sn−1)) is known, it is therefore easy to calculate the LCK(Si) local checksum associated with an Si datum of the stack frame accessed by the virtual machine, based on the gck value associated with the stack frame concerned and the remaining Sj data of the stack frame (j≠i[[i]]), by using the following operation:

LCK(Si)=~Si=GCK(S0, S1, ..., Sn−1)−(~S0+ ... +~Si−1+~Si+1+ ... +~Sn−1+n−1)

According to the example, in order to determine the local checksum associated with an Si datum of the stack frame, the complemented sum of the other data constituting the stack frame is therefore removed from the gck global checksum value.

This shows that the LCK(Si) local checksum associated with the Si datum, may be calculated without explicitly using the value of the Si datum, but only bringing into play the gck global checksum associated with the stack frame corresponding to the Si datum and the other data of the stack frame.

Said attribute is particularly advantageous in view of reinforcing the safety of the execution of applications within the context of the invention. Indeed, even if an attacker is capable of modifying the value of a datum of a stack frame at the time wherein said latter is read by the virtual machine, the associated local checksum not being calculated by using the value of the datum in question, it will therefore be possible to detect that the datum in question has been modified by comparing it with the value originating from the checksum.

Figures 2A, 2B:
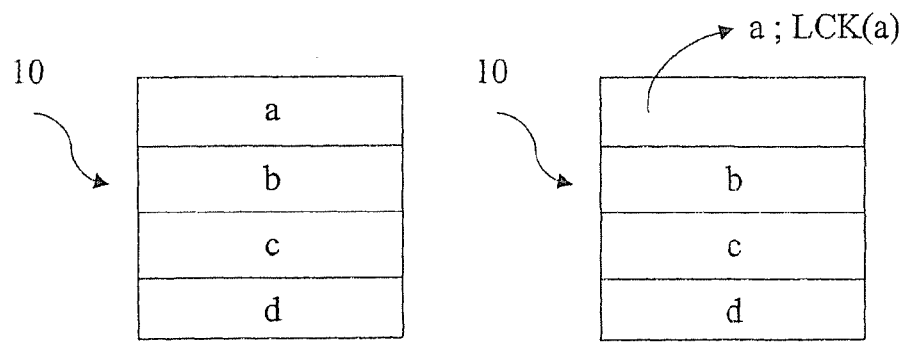
FIGS. 2a and 2b illustrate a first example of embodiment of the invention.

FIGS. 2a and 2b allow said matter to be illustrated more accurately. Let us presume that the content of a stack frame 10 is described by stacking cells from FIG. 2a, respectively comprising the stacked d, c, b and a data.

The gck global checksum associated with said stack frame may be calculated as being the sum complemented with the elements of the stack frame, by using the example of the GCK function provided above based on the ~complement operator applied to the sum of all of the elements of the stack frame:

gck=~(a+b+c+d)

Let us now presume that the a datum is unstacked from the top of the stack frame 10 as illustrated in FIG. 2b and that at the time of said operation, its value is modified fraudulently into a' via an external means.

By applying the attributes linked to the ~ operator, the following has been obtained:

gck=~a+~b+~c+~d+3

As already explained, the LCK(a) local checksum associated with the current manipulated a datum may therefore be calculated based on the gck global checksum and the data remaining in the stack frame, such that the following is obtained:

LCK(a)=gck−~(b+c+d)−1=~a

The LCK(a) local checksum may for example be calculated if the system requests a verification of the manipulated a datum. In this case, the value of the manipulated datum will be compared with the value of the datum derived from the ~a associated local checksum. As the a datum, in the example, has been modified into a' following an external attack, the comparison with the value obtained of ~a therefore indicates to the system that an error has occurred, therefore allowing it to react.

Said verification step of the integrity may be implemented optionally. Thus, it may be envisaged to defer it, to perform it at predetermined or even random times.

The virtual machine is also capable of guaranteeing the integrity of the data itself during a calculation. Said mechanism is more specifically illustrated by the example of FIGS. 3a to 3d.

Let us presume a stack frame 10, constituted by stacking the b, a, c and d data, as illustrated in FIG. 3a. The global checksum associated with the stack frame is calculated in the following manner:

gck=~(a+b+c+d)

Let us presume that the execution of the method involves the d+c calculation. The first argument of the addition constituted by the d datum is therefore initially unstacked and, by using the abovementioned principles, its associated LCK(d) local checksum may be calculated based on the gck global checksum associated with the stack frame corresponding to the data remaining in the stack frame:

LCK(d)=gck−~(b+a+c)−1=~d

Then, the gck global checksum associated with the stack frame is updated before continuing the calculation operation, in order to reflect the new state of the stack frame, the d datum having been unstacked. For this, the value of the local checksum associated with the d datum is removed from the current value of the global checksum:

gck=gck−(~d)−1=~(a+b+c)

The calculation operation is therefore continued and, as illustrated in FIG. 3c, the second argument of the addition constituted by the c datum is now unstacked. Still for the purpose of verifying the integrity of the data used in the calculation underway, the LCK(c) local checksum associated with the c datum is dynamically calculated based on the previously updated gck global checksum, to which the complemented sum of the data remaining in the stack frame is removed:

$LCK(c) = gck - \sim(b+a) - 1 = \sim c$

In the same way as before, the global checksum associated with the stack frame must be updated in order to reflect the new state of the stack frame, wherein the c datum has been unstacked. Therefore the value of the local checksum associated with the c datum is removed from the current value of the global checksum:

$gck = gck - (\sim c) - 1 = \sim(a+b)$

At said stage, the following four data are therefore manipulated by the virtual machine: c, ~c, d and ~d, which therefore allows it to be checked that the data brought into play in the calculation have not been modified at the time wherein they are read, in the same manner as explained in reference with the example of FIGS. 2a and 2b.

The (c+d) addition operation is therefore performed. The integrity of said operation may be checked by using the LCK(c) and LCK(d) local checksums, respectively associated with the c and d data. Indeed, the corresponding ~(c+d) checking operation is written: ~c+~d+1, according to the arithmetic attributes of the ~ complement operator. Thus, advantageously the LCK(c+d) local checksum associated with the result of the (c+d) operation may be calculated, without having to use the values of the c and d data directly, but only by using the LCK(c) and, LCK(d) local checksums previously calculated and associated with the data intervening in the operation. Furthermore, as already seen, the LCK(c) and LCK(d) local checksums have themselves been calculated based on the gck global checksum, without having to use the values of the c and d data.

Finally, as illustrated in FIG. 3d, once the calculation has been performed, the (c+d) result is placed in the stack frame 10. The global checksum associated with the stack frame is therefore yet to be updated, by using the local checksum associated with the result:

$gck = gck + (\sim(c+d)+1) = \sim(a+b) + \sim(c+d) + 1 = \sim(a+b+c+d)$

In the abovementioned examples, the ~ complement operator was used for calculating the local checksums. The invention may however be generalised by using the following generalisation of the ~ operator:

Either O the V set, with the following conventional arithmetic and logic operations $(+, -, *, /, \&, |)$.

Or P the V set with all of the operations symbolised in the following manner $(\boldsymbol{+}, \boxtimes, \odot, \blacklozenge, \square, \bigcirc)$.

A Chk checksum operator is defined in the following manner:

Chk: O-------------→P, such that for any op operation in the set $(+, -, *, /, \&, |)$, there is a cop corresponding operation in the $(\boldsymbol{+}, \boxtimes, \odot, \blacklozenge, \square, \bigcirc)$ set such that:

Chk(a op b)=Chk(a) cop Chk(b)

The ~ operator previously described of the complement at 1 is therefore a specific case of the Chk function:

~: $(V, (+, -, *, /, \&, |))$----------→$(V, (\boldsymbol{+}\boxtimes \odot \blacklozenge \square \bigcirc))$
a|-------------------→~a
with
$\sim(a+b) = \sim a \boldsymbol{+} \sim b = \sim a + \sim b + 1$ Mathematically, the Chk operator may be defined as a group morphism of the O space towards the P space, respecting all of the operations in P.

The principle of the invention therefore consists of associating with each stack frame of the virtual execution machine a global checksum and, each time that a datum is accessed, calculating a local checksum associated with said datum by using the global checksum associated with the stack frame concerned.

In the examples of embodiments provided above, the calculation of the global checksum associated with a stack frame consists of calculating the complemented sum of all of the elements of the stack frame. In addition, in secured mode, each time that a datum of the stack frame is accessed, its associated checksum is calculated, by using the global checksum to which is subtracted the complemented sum of the other elements of the stack frame. Also, if the length of the stack frame is substantial, said calculations may prove to be unfavourable in terms of performances (slowing down of the execution of the code in secured mode) in environments restricted in calculation resources.

Also, in the aim of reducing the number of operations required for calculating a local checksum based on a global checksum or for calculating the update of the global checksum, an improvement of the invention consists of using a plurality of global checksums associated with the same stack frame.

Figure 4:
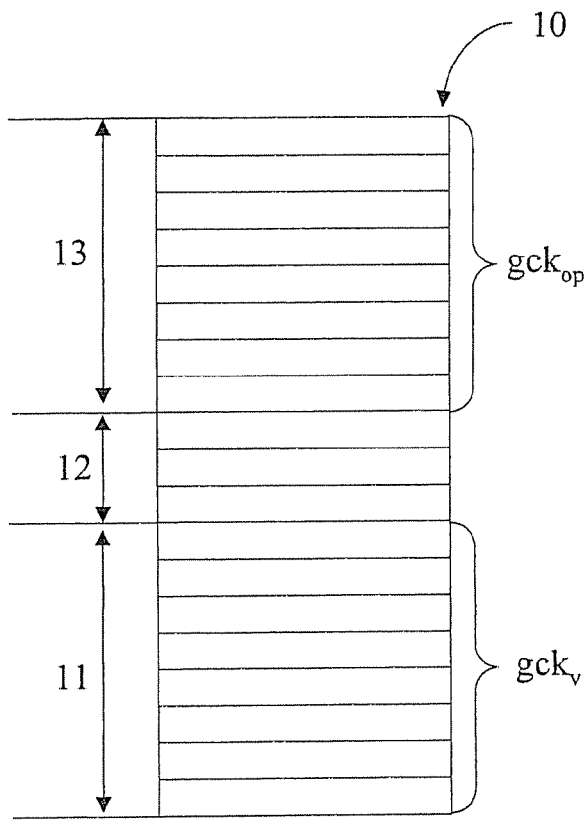
FIGS. 4 to 6 illustrate the improvements of the invention.

According to a first variant illustrated in FIG. 4, two distinctive $gck_{op}$ and $gck_v$ global checksums are used for each stack frame 10, respectively associated with the operand stack 13 of the stack frame and with the local variables 11 of the stack frame. This allows the calculations required for obtaining a local checksum to be reduced consequently, Indeed, if, for example, a datum is manipulated from the operand stack 13, its associated local checksum may be obtained from the associated $gck_{op}$ global checksum and the sum of the only other elements of the operand stack and not of the entire stack frame.

Figure 5:
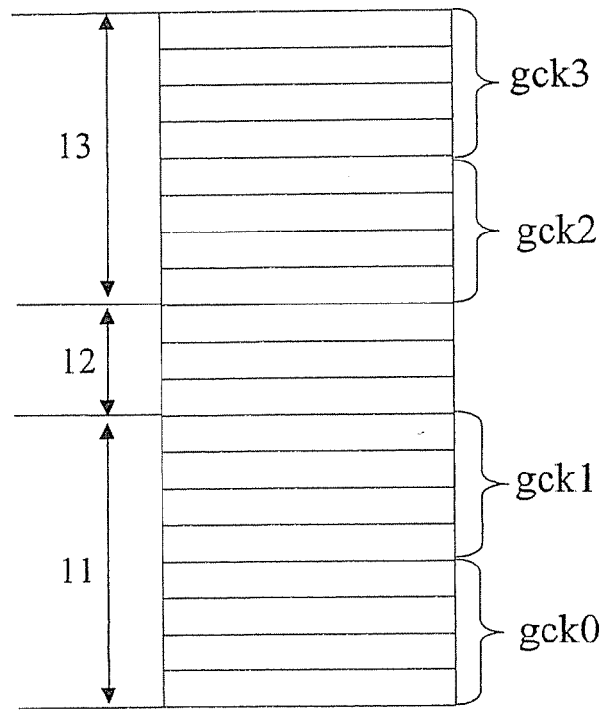

According to another variant presented in FIG. 5, the stack frame is divided into a plurality of areas, with each one of which is associated a global checksum. The areas dividing the stack frame are preferably of equal length, but division into areas of unequal lengths may, however, be envisaged. According to the example in FIG. 5, the area of local variables 11 is divided into two areas each of four elements, with the associated gck0 and gck1 global checksums, likewise the operand stack area is divided into two areas each of four elements, with respectively the associated gck2 and gck3 global checksums.

According to said embodiment, each time that a datum of the stack frame is manipulated (read or added), it is first necessary to determine which area of the stack frame is concerned, in order to use the global checksum associated with said area in order to deduce the local checksum associated with the manipulated datum.

Each global checksum associated with an area of the stack frame is in fact identified by an index (0 to 3 according to the example in FIG. 5). Also, in order to determine the global checksum to use, it is necessary for this to determine the index allowing the correct global checksum to be identified. The determination of the index may be carried out in the following manner:

index=(jSP-base)/n

Wherein jSP represents the pointer on the current element of the stack frame, the base represents the pointer on the base of the stack frame and n represents the number of elements of an area of fixed length of the stack frame.

Figure 6:
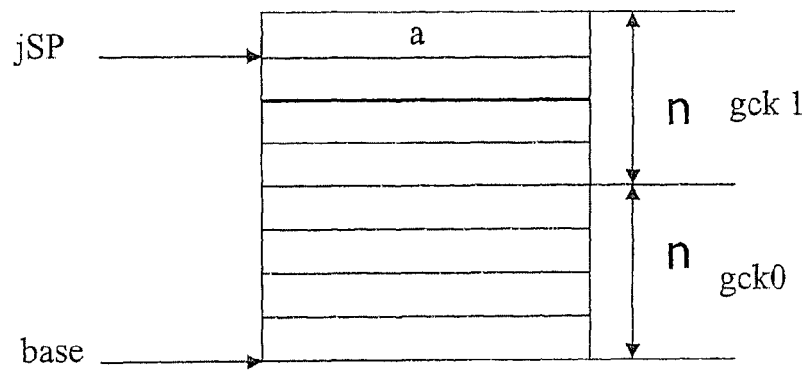

In reference to the example of FIG. 6 wherein it is presumed that the a element is unstacked from the stack frame shown, divided by way of example into two areas of length n=4, index=1 is obtained, signifying that it is necessary to use the gck1 global checksum for the area concerned.

The calculation of the local checksum associated with the a datum is therefore carried out as previously explained, by using the gck1 global checksum previously determined and by advantageously taking into account only the data of the area concerned, in comparison with all of the data of the stack frame.

The calculation of a local checksum meets the following formula:

$$LCK(a) = gck(\text{index}) - \sum_{i=base+n^*index}^{jSP} Si,$$

the Si symbolising the elements of the stack frame.

The calculations of the local and, global checksums such as they have been described may be carried out in a software manner. However, it has been seen that when the stack frames corresponding to the methods called during the execution of the code are of a considerable length, said calculations may prove to be excessively long. The abovementioned variant, consisting of dividing the stack frame into a plurality of areas with each one of which is associated a global checksum, therefore advantageously allows the calculation time to be reduced.

Figure 7:
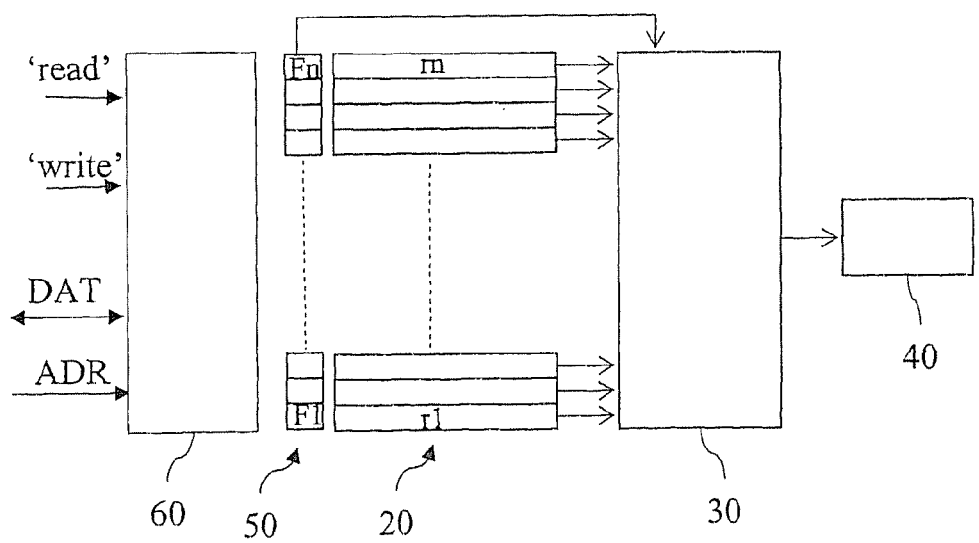
FIG. 7 illustrates an example of hardware implementation of the method according to the present invention.

Another solution is based on a hardware implementation of the calculation of checksums according to the invention. One example of hardware implementation is described in FIG. 7. According to said example of implementation, a storage area 20, consisting of a set of r1 to rn registers, is connected to a logic circuitry 30, which allows a checksum to be calculated based on the content of the n registers the storage area 20 each time that one of said registers is updated. The result of the calculation carried out by the logic circuitry 30 is therefore automatically placed in a check register 40 as a checksum.

The logic circuitry 30 is for example wired in order to execute the sum of all of the registers selected. The automatic determination of a checksum via the wired logic thus allows the rapidity of the calculations to be significantly increased in relation to a purely software implementation when the n number is high.

The set of r1 to rn registers is therefore used as a storage device allowing the corresponding data of a stack frame which is mapped on the storage area 20 to be stacked and unstacked. An F set of F1 to Fn indicators is further planned, wherein each F1 to Fn indicator is respectively associated with an r1 to rn register, allowing an update of the stack frame to be indicated. For example, when a datum is placed on the stack, the bit of the corresponding indicator is placed at 1 and when a datum is unstacked, the bit of the corresponding indicator is placed at 0. Thus, on each change detected in the set of F indicators, the checksum is recalculated via the logic circuitry 30 based on the content of all of the ri to rn registers of which the bit of the corresponding indicator is placed at 1.

The hardware set 20, 30, 40, 50 cooperates with an interface device 60 connected to a processing unit of the component on which the code is executed. The operations of adding and removing data on a stack frame may therefore be performed, checked via the hardware configuration described.

Thus, the data set of a stack frame being mapped in the storage area 20, when a datum must be removed, the current checksum, known as CHK1, associated with the stack frame is first read from the register 40. Then, a 'read' signal indicating to the interface device 60 that a datum is removed, said latter commands the updating of registers 20 and indicators 50 on the database of ADR address and DAT data signals received by the processing unit and an updated checksum value, known as CHK2, is automatically calculated and placed in the check register 40. Thus, based on the CHK1 and CHK2 checksums automatically calculated, the system may determine the local checksum associated with the datum removed in order to verify its integrity.

In the same way, when a datum must be added to the stack, the current checksum, known as CHK1, associated with the stack frame is first read from the register 40. A 'write' signal therefore indicates to the interface device 60 that a datum is added, thus commanding the update of the registers 20 and indicators 50 on the database of ADR address and DAT data signals received by the processing unit. Once the a datum has been loaded in the corresponding register of the storage area 20, the checksum is automatically recalculated and the updated CHK2 value is placed in the check register 40. Thus, based on the CHK1 and CHK2 checksums automatically calculated, the system may determine the local checksum associated with the datum added in order to verify its integrity.

The invention claimed is:

1. A computer implemented method for protecting data of an application compiled in intermediate code to be executed on a digital apparatus comprising a virtual machine configured to manage the execution of the code via an execution stack defining at least one stack frame storing elements of a function called by the virtual machine during the execution of the code, comprising the application of a secured execution mode of the code, the computer-implemented method comprising:
   determining, by a processor, at least one global checksum associated with an area of each stack frame and, said global checksum being calculated using the value of all data from the associated area; and
   each time that a datum of the code is manipulated, calculating, by the processor, a local checksum associated with said datum, based on:
      the global checksum associated with the area corresponding to the manipulated datum; and
      at least one part of the other data constituting said area.

2. The computer implemented method according to claim 1, further comprising dividing each area into a plurality of areas and the determination of a plurality of global checksums respectively associated with each area of the stack frame.

3. The computer implemented method according to claim 2, further comprising: determining, prior to the calculating of the local checksum associated with the manipulated datum, the global checksum associated with the area wherein the manipulated datum is stored.

4. The computer implemented method according to claim 3, wherein the calculating of the local checksum associated with the manipulated datum is performed based on:
   the global checksum associated with the area wherein the manipulated datum is stored; and
   other data of said area.

5. The computer-implemented method according to claim 4, wherein each stack frame is divided into two areas, respectively corresponding to a local variable area of the function called and an operand stack area of said method.

6. The computer implemented method according to claim 2, wherein each stack frame is divided into two areas, respectively corresponding to a local variable area of the function and an operand stack area of said function.

7. The computer-implemented method according to claim 3, wherein each stack frame is divided into two areas, respectively corresponding to a local variable area of the function called and an operand stack area of said function.

8. An apparatus comprising a virtual machine configured to:
   execute an application compiled in intermediate code on the apparatus; and
   manage the execution of the code via an execution stack defining at least one stack frame storing elements of a function called by the virtual machine during the execution of the code, the function comprising the application of a secured execution mode of the code, wherein the virtual machine comprises instructions stored in a non-volatile storage device of the apparatus that, if executed by the apparatus, cause the apparatus to perform operations comprising:
      determining at least one global checksum associated with an area of each stack frame and, said global checksum being calculated using the value of all data from the associated area; and
      in response to determining that a datum of the code is manipulated, calculating a local checksum associated with said datum, based on:
         the global checksum associated with the area corresponding to the manipulated datum; and
         at least one part of the other data constituting said area.

9. The apparatus according to claim 8, the operations further comprising:
   dividing each area into a plurality of areas and the determination of a plurality of global checksums respectively associated with each area of the stack frame.

10. The apparatus according to claim 9, the operations further comprising: determining, prior to the calculating of the local checksum associated with the manipulated datum, the global checksum associated with the area wherein the manipulated datum is stored.

11. The apparatus according to claim 10, wherein the calculating of the local checksum associated with the manipulated datum is performed based on:
   the global checksum associated with the area wherein the manipulated datum is stored; and
   other data of said area.

12. The apparatus according to claim 11, wherein each stack frame is divided into two areas, respectively corresponding to a local variable area of the function called and an operand stack area of said function.

13. The apparatus according to claim 10, wherein each stack frame is divided into two areas, respectively corresponding to a local variable area of the function called and an operand stack area of said function.

14. The apparatus according to claim 8, wherein each stack frame is divided into two areas, respectively corresponding to a local variable area of the function called and an operand stack area of said function.

15. The apparatus of claim 8, wherein the apparatus comprises a smart card.

16. A digital apparatus comprising a non-volatile storage device storing in memory a virtual machine configured to:
   execute an application compiled in intermediate code on the digital apparatus; and
   manage the execution of the code via an execution stack defining at least one stack frame storing elements of a function called by the virtual machine during the execution of the code, wherein the virtual machine comprises instructions that, if executed by the apparatus, cause the apparatus to perform operations comprising:
      determining at least one global checksum associated with an area of each stack frame and, said global checksum being calculated using the value of all data from the associated area; and
      in response to determining that a datum of the code is manipulated, calculating a local checksum associated with said datum, based on:
         the global checksum associated with the area corresponding to the manipulated datum; and
         at least one part of the other data constituting said area.

17. The digital apparatus according to claim 16, wherein the digital apparatus further comprises a smart card.

18. The digital apparatus according to claim 16, wherein each stack frame is divided into two areas, respectively corresponding to a local variable area of the function called and an operand stack area of said function.

* * * * *